United States Patent
Yang et al.

(10) Patent No.: US 8,134,911 B2
(45) Date of Patent: Mar. 13, 2012

(54) OFDM-BASED DEVICE AND METHOD FOR PERFORMING SYNCHRONIZATION IN THE PRESENCE OF INTERFERENCE SIGNALS

(75) Inventors: Jingnong Yang, Santa Clara, CA (US); Won-Joon Choi, Cupertino, CA (US)

(73) Assignee: Amicus Wireless Technology Ltd. (KY)

( * ) Notice: Subject to any disclaimer, the term of this patent is extended or adjusted under 35 U.S.C. 154(b) by 964 days.

(21) Appl. No.: 12/126,835

(22) Filed: May 23, 2008

(65) Prior Publication Data

US 2008/0291893 A1  Nov. 27, 2008

Related U.S. Application Data

(60) Provisional application No. 60/931,673, filed on May 25, 2007.

(51) Int. Cl.
*H04L 27/06* (2006.01)
(52) U.S. Cl. ......... 370/203; 370/350; 370/503; 375/344
(58) Field of Classification Search ............... 370/203, 370/210, 304, 350, 395.62, 503, 509; 375/344
See application file for complete search history.

(56) References Cited

U.S. PATENT DOCUMENTS

| | | | |
|---|---|---|---|
| 6,373,861 B1 * | 4/2002 | Lee | 370/503 |
| 7,027,429 B2 * | 4/2006 | Laroia et al. | 370/350 |
| 7,088,787 B2 | 8/2006 | Wang et al. | |
| 7,123,670 B2 | 10/2006 | Gilbert et al. | |
| 7,366,089 B2 | 4/2008 | Tehrani et al. | |
| 7,558,245 B2 * | 7/2009 | Laroia et al. | 370/350 |
| 7,580,490 B2 * | 8/2009 | Suh et al. | 375/349 |
| 7,869,489 B2 * | 1/2011 | Jang | 375/150 |
| 2002/0196731 A1 * | 12/2002 | Laroia et al. | 370/206 |
| 2005/0147024 A1 * | 7/2005 | Jung et al. | 370/203 |
| 2005/0249319 A1 * | 11/2005 | Suh et al. | 375/347 |
| 2006/0104257 A1 * | 5/2006 | Laroia et al. | 370/350 |
| 2006/0233270 A1 | 10/2006 | Ahn et al. | |
| 2007/0253472 A1 * | 11/2007 | Jang | 375/150 |
| 2007/0268976 A1 * | 11/2007 | Brink et al. | 375/260 |
| 2008/0212563 A1 * | 9/2008 | Birru | 370/350 |
| 2011/0080902 A1 * | 4/2011 | Jang | 370/344 |

* cited by examiner

*Primary Examiner* — Chirag Shah
*Assistant Examiner* — Jay P Patel
(74) *Attorney, Agent, or Firm* — Thomas H. Ham; Wilson Ham & Holman (57) ABSTRACT

An OFDM-based device and method for performing synchronization utilizes a time-domain preamble of an incoming OFDM-based signal to compute an estimated fine frequency offset. The computation of the estimated fine frequency offset involves multiplying values of the time-domain preamble with conjugates of corresponding values of a selected base station time-domain preamble, averaging the resulting multiplied values in predefined segments and self-correlating the resulting averaged values to derive a self-correlation value, which is used to compute the estimated fine frequency offset.

20 Claims, 8 Drawing Sheets

OFDM-BASED DEVICE AND METHOD FOR PERFORMING SYNCHRONIZATION IN THE PRESENCE OF INTERFERENCE SIGNALS

CROSS REFERENCE TO RELATED APPLICATION

This application is entitled to the benefit of U.S. Provisional Patent Application Ser. No. 60/931,673, filed on May 25, 2007, which is incorporated herein by reference.

BACKGROUND OF THE INVENTION

Orthogonal Frequency Division Multiple Access (OFDMA) technology is popular in modern communication systems since this technology can efficiently support multiple mobile stations with limited bandwidth and easily provide Quality of Service (QoS). The OFDMA technology is a multiple access version of orthogonal frequency-division multiplexing (OFDM). OFDM is a modulation technique for data transmission based on frequency-division multiplexing (FDM), which uses different frequency channels to transmit multiple streams of data. In OFDM systems, a wideband channel is divided into multiple narrow-band orthogonal "subcarriers" in the frequency domain, each of which is modulated by digital signal in parallel.

In OFDMA systems, multiple subscribers can simultaneously use different subcarriers for signal transmission. Thus, in an OFDMA system, multiple data bursts can be transmitted from a base station (BS) to multiple mobile stations in the same time frame but allocated in different frequency subcarriers. Consequently, an OFDMA system can support multiple mobile stations using different subcarriers.

At a transmitter of an OFDMA system, input information is assembled into blocks of N complex symbols, one for each subcarrier. An N-point inverse Fast Fourier Transform (FFT) is then performed on each block, and the resultant time domain signal is transmitted. Usually, several blocks are grouped to form a frame, and one extra block with known pattern, which is referred to as the "preamble", is inserted into the beginning of every frame for signal detection, synchronization and channel estimation purposes.

At a receiver of the OFDMA system, the presence of signal needs to be detected and the starting point of a frame needs to be estimated. In addition, a BS needs to be detected and set as the serving BS. Furthermore, in order to synchronize to the transmitter, frequency offset from the serving BS needs to be estimated, which can be challenging in the presence of interference signals. The frequency offset estimate can then be used to synchronize to the serving BS.

In view of these requirements, there is a need for an OFDM-based device and method for performing synchronization even in the presence of interference signals.

SUMMARY OF THE INVENTION

An OFDM-based device and method for performing synchronization utilizes a time-domain preamble of an incoming OFDM-based signal to compute an estimated fine frequency offset. The computation of the estimated fine frequency offset involves multiplying values of the time-domain preamble with conjugates of corresponding values of a selected base station time-domain preamble, averaging the resulting multiplied values in predefined segments and self-correlating the resulting averaged values to derive a self-correlation value, which is used to compute the estimated fine frequency offset.

A method for performing synchronization in an OFDM-based device in accordance with an embodiment of the invention comprises (a) receiving an incoming OFDM-based signal with a time-domain preamble having first, second and third slots, (b) multiplying values of the time-domain preamble with conjugates of corresponding values of a selected base station time-domain preamble to produce an output set of multiplied values having first, second and third slots, (c) averaging the multiplied values in predefined segments of the output set to produce averaged values, (d) self-correlating the averaged values corresponding to one of the first, second and third slots of the output set with the averaged values corresponding to another slot of the output set to derive a self-correlation value, and (e) computing an estimated fine frequency offset with respect to the incoming OFDM-based signal using the self-correlation value.

An OFDM-based device in accordance with an embodiment of the invention comprises a fine frequency offset estimator configured to estimate fine frequency offset using an incoming OFDM-based signal with a time-domain preamble having first, second and third slots. The fine frequency offset estimator comprises a multiplying unit, an averaging unit, a correlation unit and a computing unit. The multiplying unit is configured to multiply values of the time-domain preamble with conjugates of corresponding values of a selected base station time-domain preamble to produce an output set of multiplied values having first, second and third slots. The averaging unit is configured to average the multiplied values in predefined segments of the output set of multiplied values to produce averaged values. The correlation unit is configured to self-correlate the averaged values corresponding to one of the first, second and third slots of the output set with the averaged values corresponding to another slot of the output set to derive a self-correlation value. The computing unit is configured to compute an estimated fine frequency offset with respect to the incoming OFDM-based signal using the self-correlation value.

Other aspects and advantages of the present invention will become apparent from the following detailed description, taken in conjunction with the accompanying drawings, illustrated by way of example of the principles of the invention.

DETAILED DESCRIPTION

Figure 1:
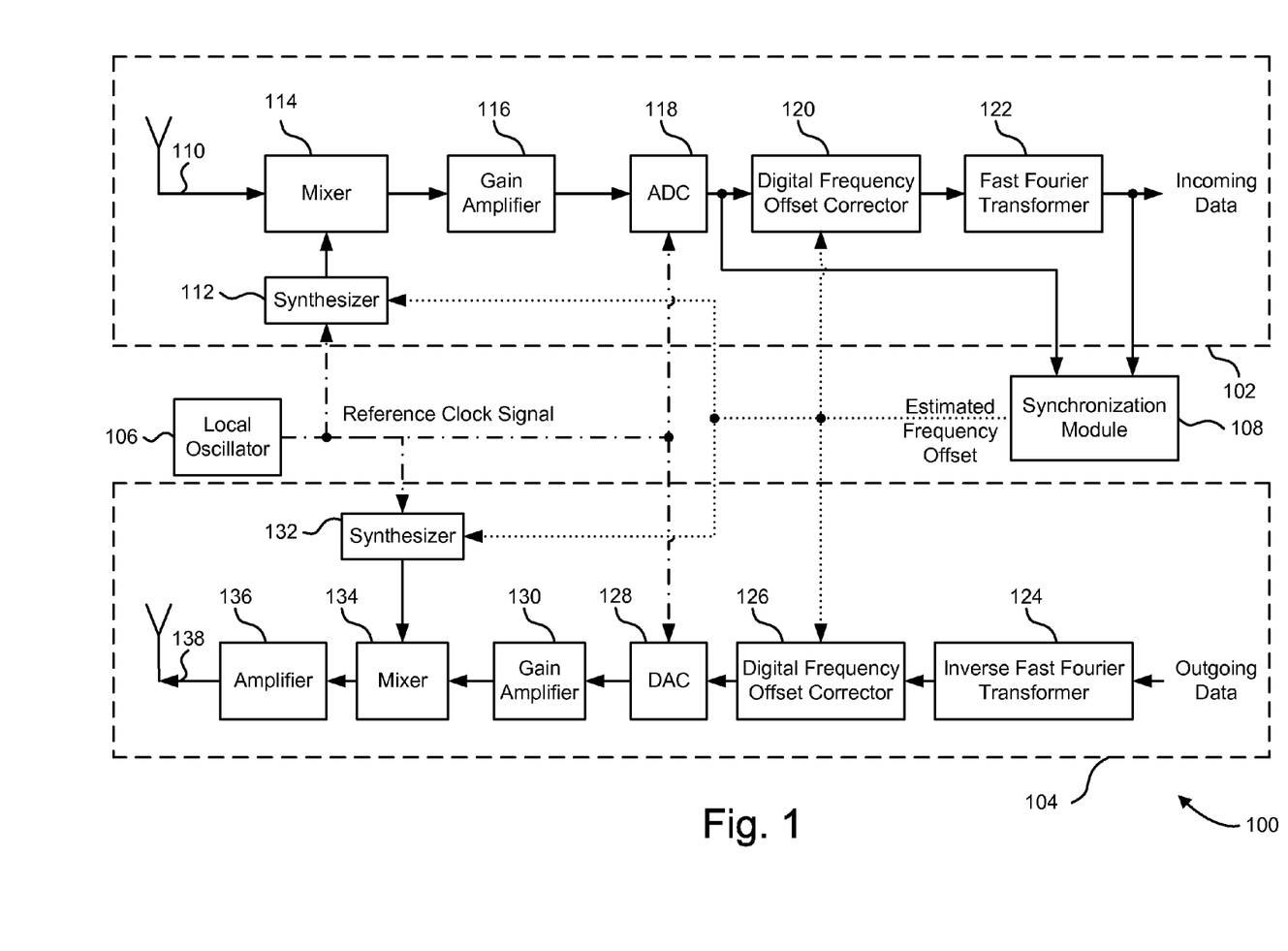
FIG. 1 is a block diagram of a device based on Orthogonal Frequency Division Multiple (OFDM) in accordance with an embodiment of the invention.

With reference to FIG. 1, a device 100 based on Orthogonal Frequency Division Multiple (OFDM) in accordance with an embodiment of the invention is described. In this embodiment, the OFDM-based device 100 is a mobile station of an Orthogonal Frequency Division Multiple Access (OFDMA) system that receives incoming OFDM signals from a base station (BS) of the system and transmits outgoing OFDM signals to the BS. As described in more detail below, the OFDM-based device 100 is configured to select the strongest BS as the serving BS, to effectively estimate the frequency offset with respect to the serving BS, even in the presence of interference signals, and then to apply the estimated frequency offset in both analog and digital domains to correct for synchronization errors due to the frequency offset.

As shown in FIG. 1, the OFDM-based device 100 includes a receiver 102, a transmitter 104, a local oscillator 106 and a synchronization module 108. The receiver 102 operates to receive incoming OFDM signals from the BS and then to process the received signals to extract the incoming data embedded in the signals. The transmitter 104 operates to process outgoing data to produce outgoing OFDM signals and then to transmit the signals to the BS. The local oscillator 106 is configured to generate a reference clock signal, which is used in the receiver 102 and the transmitter 104. The synchronization module 108 operates to produce a frequency offset estimate signal, which is used at the receiver 102 and the transmitter 104 to correct for synchronization errors due to frequency offset in the incoming and outgoing signals. The synchronization module 108 also operates to calculate carrier-to-interference-plus-noise-ratio (CINR), select a serving BS, identify false detection and detect blockers. The synchronization module 108 is described in more detail below.

As shown in FIG. 1, the receiver 102 includes a receiving antenna 110, a synthesizer 112, a mixer 114, a gain amplifier 116, an analog-to-digital converter (ADC) 118, a digital frequency offset corrector 120 and a fast Fourier transformer 122. The receiver 102 further includes other components commonly found in an OFDM-based receiver. However, these other components are not described herein so that the inventive features of the invention are not obscured.

The synthesizer 112 is connected to the local oscillator 106 to receive the reference clock signal. The synthesizer 112 is also connected to the synchronization module 108 to receive a frequency offset estimate in the form of a signal from the synchronization module. The frequency offset estimate from the synchronization module 108 is used to compensate for the frequency offset between the reference clock signal of the local oscillator 106 and the clock signal used at the transmitting BS. The synthesizer 112 is configured to adjust the resulting mixer signal using the frequency offset estimate signal to compensate for the frequency offset of the reference clock signal. As an example, the synthesizer 112 may use a fractional phase lock loop to produce a frequency offset-compensated mixer signal. However, other known techniques may be utilized to produce the frequency offset-compensated mixer signal using the reference clock signal and the frequency offset estimate signal.

The receiving antenna 110 is used to receive an incoming OFDM signal from the BS. Although the receiver 102 is shown with a single receive antenna, the receiver may include multiple receive antennas for multi-input multi-output (MIMO) communication. The mixer 114 is configured to mix the received incoming OFDM signal with the frequency offset-compensated mixer signal from the synthesizer 112 to down convert the frequency of the incoming OFDM signal to the baseband frequency. The gain amplifier 116 is configured to amplify the down-converted signal. The ADC 118 is configured to convert the amplified down-converted signal from an analog signal into a digital signal. The ADC 118 is connected to the local oscillator 106 to receive the reference clock signal, which is used as the sampling clock signal for converting the down-converted signal into a digital signal. Since the reference clock signal from the local oscillator 106 is not corrected for frequency offset, the resulting digital signal includes sampling errors due to the frequency offset of the reference clock signal.

The digital frequency offset corrector 120 operates to receive the digital down-converted signal from the ADC 118 and correct the sampling errors in the digital down-converted signal using the estimated frequency offset from the frequency offset estimator 108. In an embodiment, the digital frequency offset corrector 120 is connected to the ADC 118 and positioned before the fast Fourier transformer 122, as illustrated in FIG. 1. Thus, in this embodiment, the digital frequency offset corrector 120 operates in the time domain. In this embodiment, the digital frequency offset corrector 120 is configured to digitally resample the digital down-converted signal at a frequency offset-compensated sampling rate (i.e., frequency of the reference clock signal without frequency offset), which is derived using the estimated frequency offset signal from the synchronization module 108, so that the sampling errors can be corrected.

In this embodiment, the fast Fourier transformer 122 is connected to the digital frequency offset corrector 120 to receive the sampling error-corrected signal. The fast Fourier transformer 122 is configured to perform fast Fourier transform on the OFDM symbols in the received signal. The fast Fourier transformer 122 may also be connected to the synchronization module 108 to receive symbol timing error estimations, which are based on frequency offset estimates. The estimated symbol timing error may be used by the fast Fourier transformer 122 to determine the boundaries of the OFDM symbols to properly convert the OFDM symbols into frequency components, which are further processed to extract the data in the received signal.

In another embodiment, the digital frequency offset corrector 120 is positioned after the fast Fourier transformer 122. Thus, in this embodiment, the digital frequency offset corrector 120 operates in the frequency domain. In this embodiment, the digital frequency offset corrector 120 is configured to correct linear phase shift from one OFDM symbol to another. The linear phase shift is caused by the sampling errors introduced into the digital down-converted signal at the ADC 118 due to the reference clock signal from the local oscillator 106. Using the estimated frequency offset signal from the frequency offset estimator 108, the digital frequency offset corrector 120 is configured to calculate the sampling time error. The linear phase shift can then be calculated from the sampling time error and be corrected by the digital frequency offset corrector 120.

In the illustrated embodiment, the synchronization module 108 is connected to the receiving signal path at a node between the ADC 118 and the digital frequency offset corrector 120 to use the preambles of the incoming OFDM signal in the time domain. The synchronization module 108 is also connected to the receiving signal path at a node after the Fast Fourier Transformer 122 to use the preambles of the incoming OFDM signal in the frequency domain.

The transmitter 104 of the OFDM-based device 100 includes an inverse fast Fourier transformer 124, a digital frequency offset corrector 126, a digital-to-analog converter (DAC) 128, a gain amplifier 130, a synthesizer 132, a mixer 134, an amplifier 136 and a transmitting antenna 138. The inverse fast Fourier transformer 124 receives data to be transmitted and transforms the data from frequency components into time domain waveform, thereby converting the data from the frequency domain into the time domain.

The digital frequency offset corrector 126 is connected to the inverse fast Fourier transformer 124 to receive the time domain waveform, which is a digital outgoing OFDM signal. The digital frequency offset corrector 126 is also connected to the synchronization module 108 to receive a signal containing the frequency offset estimate. The digital frequency offset corrector 126 operates to digitally resample the digital outgoing signal at the correct sampling rate using the frequency offset estimate in anticipation of sampling errors that will be introduced at the DAC 128.

The DAC 128 is connected to the digital frequency offset corrector 126 to receive the digital outgoing signal, which has now been corrected in anticipation of sampling errors. The DAC 128 is also connected to the local oscillator 106 to receive the reference clock signal. The DAC 128 converts the digital outgoing signal into an analog signal using the reference clock signal as the sampling clock signal. The resulting analog signal is then amplified by the gain amplifier 130 and transmitted to the mixer 134.

The mixer 134 is connected to the gain amplifier 130 to receive the analog outgoing signal. The mixer 134 operates to mix the analog outgoing signal with a frequency offset-compensated mixer signal to up convert the analog outgoing signal for wireless transmission. In an embodiment, the mixer 134 is connected to the synthesizer 132 to receive the frequency offset-compensated mixer signal. Similar to the synthesizer 112 of the receiver 102, the synthesizer 132 is connected to the local oscillator 106 to receive the reference clock signal, which is used to produce the mixer signal. The synthesizer 132 is also connected to the synchronization module 108 to receive the frequency offset estimate signal, which is used to compensate for the frequency offset. As an example, the synthesizer 132 may use a fractional phase lock loop to produce the frequency offset-compensated mixer signal. However, other known techniques may be utilized to produce the frequency offset-compensated mixer signal using the reference clock signal and the frequency offset signal estimate.

In an alternative embodiment, the mixer 134 may be connected to the synthesizer 112 of the receiver 102 to receive the frequency offset-compensated mixer signal from that synthesizer. In this embodiment, the synthesizer 132 is not needed, and thus, can be removed from the OFDM-based device 100.

The up-converted outgoing signal is then amplified by the amplifier 136 and transmitted via the transmitting antenna 138. In an alternative embodiment, the outgoing signal is transmitted using the antenna 110, which is used to both receive and transmit OFDM signals. In this embodiment, the transmitting antenna 138 is not needed, and thus, can be removed from the OFDM-based device 100.

Various components of the OFDM-based device 100 represent functional blocks that can be implemented in any combination of software, hardware and firmware. In addition, some of these components of the OFDM-based device 100 may be combined or divided so the OFDM-based device 100 includes fewer or more components than described and illustrated herein.

Figure 2:
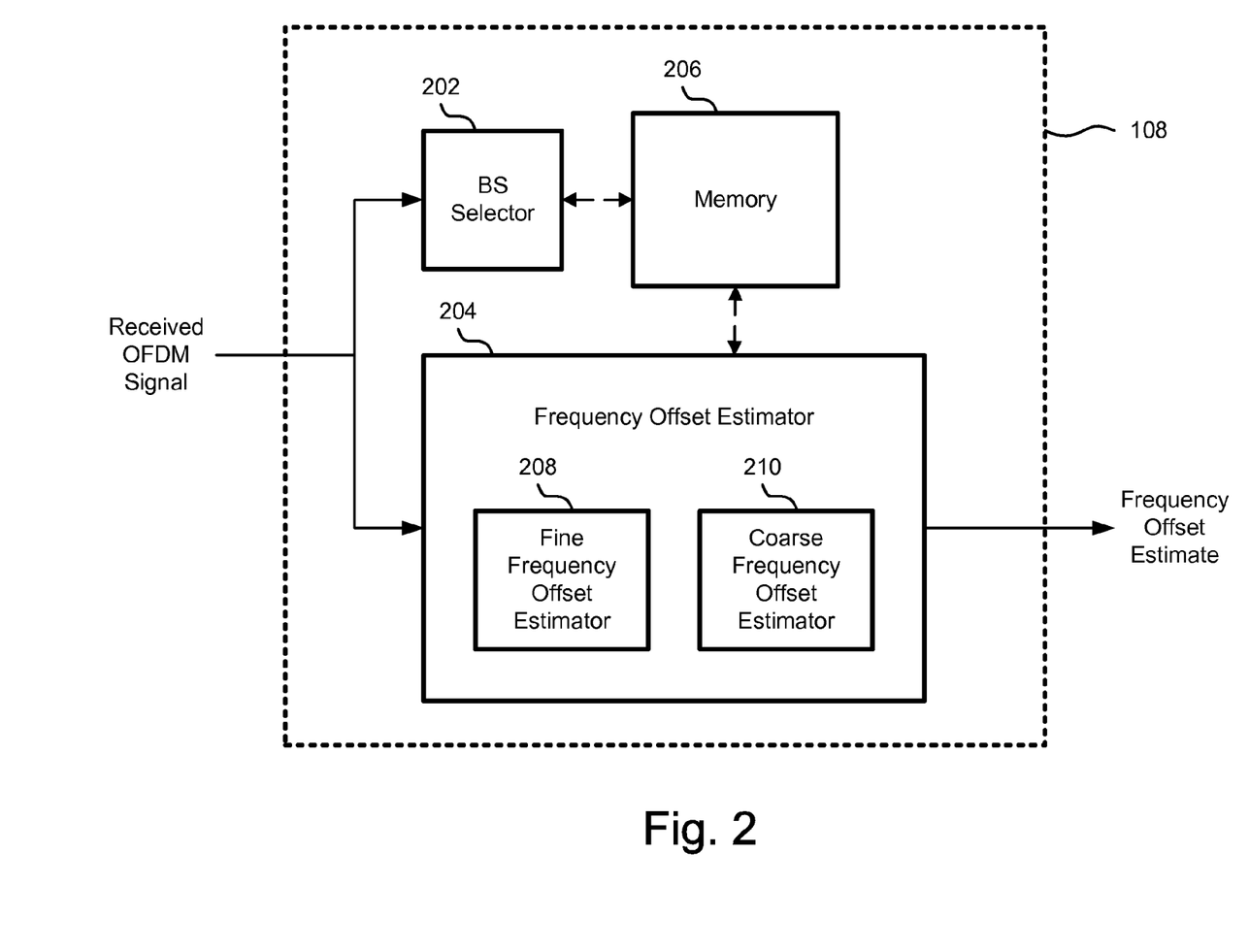
FIG. 2 is a block diagram of a synchronization module in the device of FIG. 1 in accordance with an embodiment of the invention.

Turning now to FIG. 2, components of the synchronization module 108 are shown. As shown in FIG. 2, the synchronization module 108 includes a BS selector 202, a frequency offset estimator 204 and memory 206. The memory 206 may be located within the synchronization module 108 or may be located elsewhere in the OFDM-based device 100. The BS selector 202 and the frequency offset estimator 204 of the synchronization module 108 are described in detail below.

The BS selector 202 operates to select the strongest BS as the serving BS and to estimate coarse timing, which is the estimated timing for the start of a frame in the received OFDM signal. The operation of the BS selector 202 is first described when initial frequency offset is expected to be small, for example, if the local oscillator 106 of the OFDM-based device 100 is a high quality oscillator.

In the following description, samples or values of the time-domain received signal are denoted as x[n], where n is time index. Similarly, values of a time-domain preamble for a BS is denoted as $p_k[n]$, where n is time index, and k is BS index. In some embodiments, $p_k[n]$ can be pre-computed and stored in the memory 206, or dynamically computed by doing IFFT on a frequency-domain preamble. Note that to save memory and to simplify the implementation of the algorithm, $p_k[n]$ can be quantized. As an example, sign of $p_k[n]$ could be used in place of $p_k[n]$, with a slight loss of performance.

Figure 3A:
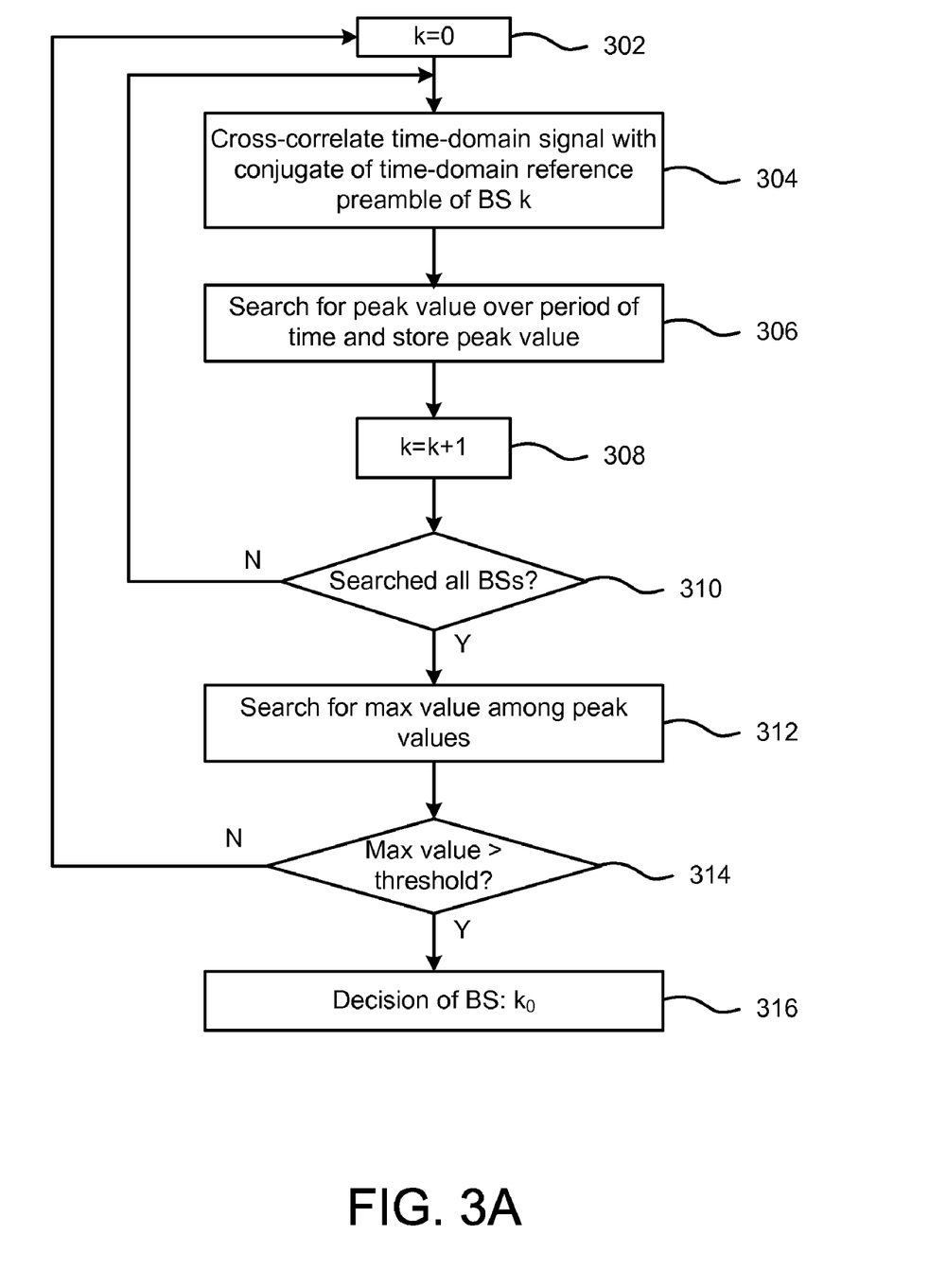
FIG. 3A is a flow diagram of an operation of a base station selector in the synchronization module when initial frequency offset is expected to be small in accordance with an embodiment of the invention.

The operation of the BS selector 202 when initial frequency offset is expected to be small is described with reference to a flow diagram of FIG. 3A. At block 302, the BS index k is set to zero. Next, at block 304, a time-domain received OFDM-based signal is cross-correlated with the conjugate of the time-domain reference preamble of BS index k=0 to derive cross-correlation values using the following equation:

$$y_k[n] = \sum_{m=0}^{M} x[n-m]p_k^*[M-m],$$

where M is length of the time-domain preamble and $p_k^*[M-m]$ is the conjugate of $p_k[M-m]$. Next, at block 306, the cross-correlation values are searched over a period of time, which may be slightly longer than one frame duration, to find the peak value of the cross-correlation values, i.e., $$\max_n |y_0[n]|^2$$

and the peak value is stored in the memory 206. The location of this peak value in the received signal is the coarse timing point, i.e., the estimated time for the start of a frame in the received signal, if the BS of index k=0 is selected as the serving BS.

Next, at block 308, the BS index k is incremented to k=k+1. Next, at block 310, a determination is made whether all possible BSs have been searched. If no, then the operations proceeds back to block 304 to search the next possible BS. If yes, then the operation proceeds to block 312, where the stored peak values $$\{\max_n |y_k[n]|^2, \forall k\}$$

are searched to find the maximum peak value, which is denoted as $|y_{k_0}|^2$, where $k_0$ is the current BS index. Next, at block 314, a determination is made whether the $|y_{k_0}|^2$ is above a predetermined threshold to decide whether to use this maximum value. If no, then the operation proceeds back to block 302 to start the search process all over again. If yes, then the operations proceeds to block 316, where the BS index $k_0$ is determined to be the strongest BS index and the location of the peak of $|y_{k_0}[n]|^2$, i.e., $$\arg\max_n |y_{k_0}[n]|^2,$$

is the estimate of coarse timing. Thus, the BS of index $k_0$ is selected as the serving BS. As a result, the OFDM-based device 100 will synchronize to the BS of index $k_0$.

In the above operation, the repeated process of cross-correlation and peak correlation value determination is performed serially for the different BS indexes. In another embodiment, the process of cross-correlation and peak correlation value determination for multiple BS indexes can be performed in parallel to search for multiple BSs simultaneously in order to speed up the operation of the BS selector 202. However, this increase in speed for the operation of the BS selector 202 comes with cost of increased hardware area.

When initial frequency offset is expected to be large, for example, if the local oscillator 106 of the OFDM-based device 100 is a low quality oscillator, the above cross-correlation technique may not work. Thus, for the situation when initial frequency offset is expected to be large, the operation of the BS selector 202 is slightly modified.

Figure 3B:
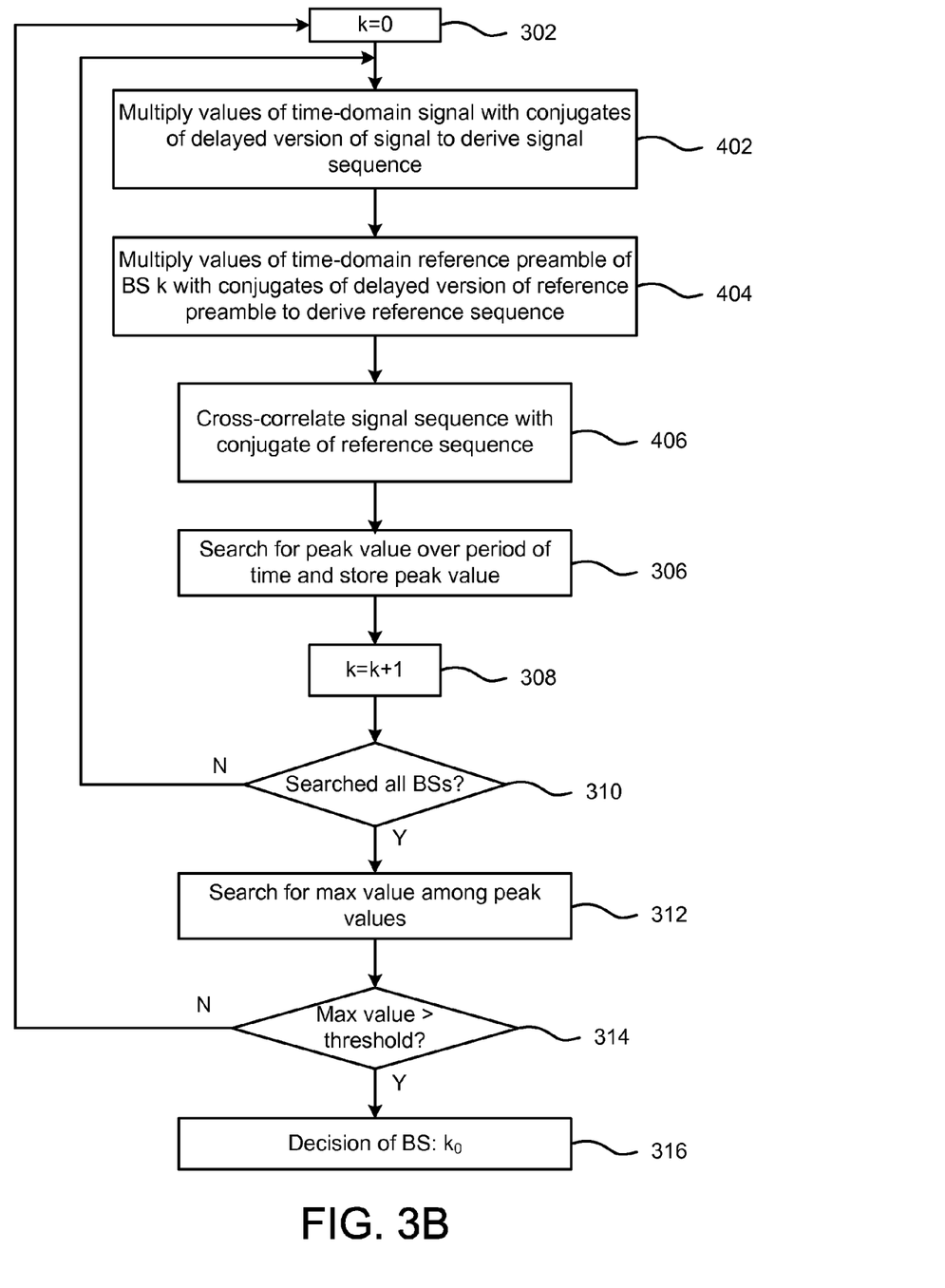
FIG. 3B is a flow diagram of an operation of the base station selector in the synchronization module when initial frequency offset is expected to be large in accordance with an embodiment of the invention.

The operation of the BS selector 202 when initial frequency offset is expected to be large is described with reference to a flow diagram of FIG. 3B. In the flow diagram of FIG. 3B, the reference numbers of FIG. 3A are used to indicate similar blocks. After block 302, the values of the time-domain received OFDM-based signal are multiplied by the conjugates of a delayed version of the time-domain received OFDM-based signal to derive a signal sequence of multiplied values z[n] using the following equation: $z[n]=x[n]x^*[n-1]$, at block 402. Note that frequency offset gets largely canceled out after this multiplication, and the remaining effect of frequency offset is a small constant phase factor on the multiplied sequence z[n]. Similar treatment is also done to the values of the time-domain reference preamble for the current BS to derive a reference sequence of multiplied values q[n] using the following equation: $q_k[n]=p_k[n]p_k^*[n-1]$, at block 404.

Next, at block 406, the sequence z[n] is cross-correlated with the conjugate of the sequence $q_k[n]$ for the current BS index k. The operation then proceeds in a similar manner as described above with respect to the flow diagram of FIG. 3A. Since the squared magnitude of cross-correlation is the interested quantity, the constant phase factor on z[n] caused by frequency offset is immaterial.

After the BS index $k_0$ is selected, the large frequency offset has to be estimated. This large frequency offset can be estimated by first estimating fine frequency offset in the time domain and then estimating coarse frequency offset, as described below with respect to the frequency offset estimator 204.

The frequency offset estimator 204 operates to perform a fine frequency offset estimation, which is performed during acquisition and tracking modes of the OFDM-based device 100, and a coarse frequency offset estimation, which is performed during the acquisition mode. Thus, as shown in FIG. 2, the frequency offset estimator 204 includes a fine frequency offset estimator 208 and a coarse frequency offset estimator 210.

Figure 4:
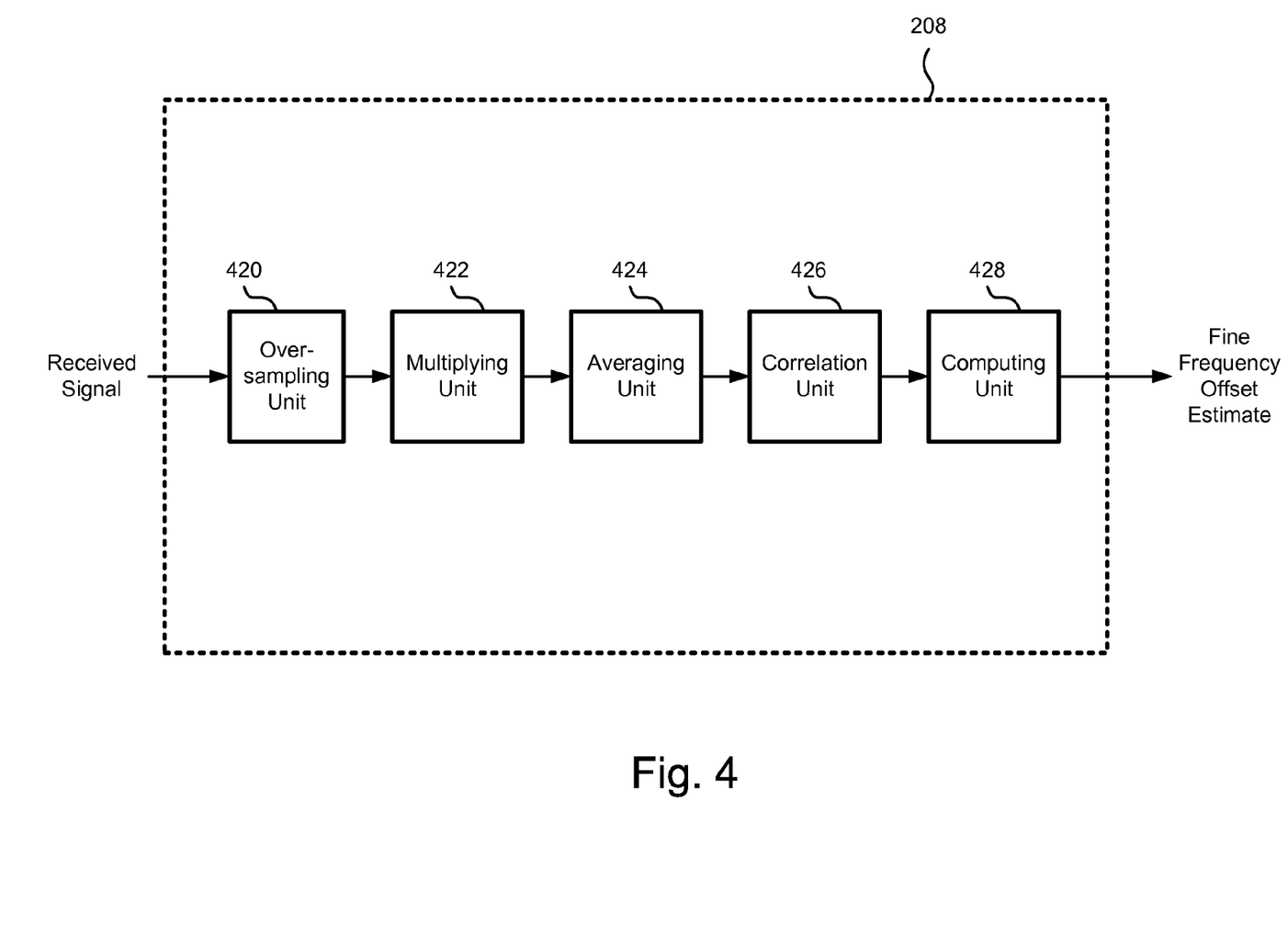
FIG. 4 is a block diagram of a fine frequency offset estimator in the synchronization module in accordance with an embodiment of the invention.

Turning now to FIG. 4, components of the fine frequency offset estimator 208 in accordance with an embodiment of the invention are illustrated. As shown in FIG. 4, the fine frequency offset estimator 208 includes an oversampling unit 420, a multiplying unit 422, an averaging unit 424, a correlation unit 426 and a computing unit 428. As described in detail below, the fine frequency offset estimator 208 operates to compute an estimated fine frequency offset by first cross-correlating a time-domain signal preamble of a received signal with the time-domain reference preamble of the selected BS, followed by partial averaging and then by using the phase difference between data samples in different slots.

Figure 5:
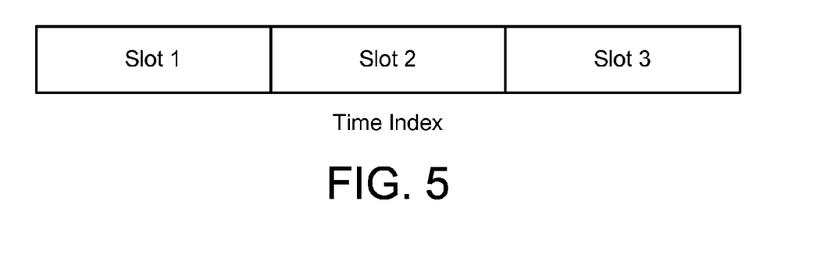
FIG. 5 is a diagram of a periodic preamble in the time domain.

In order to estimate the fine frequency offset, it is assumed that timing has been accurately estimated and that the serving BS index has been properly detected by the BS selector 202. The fine frequency offset estimation performed by the fine frequency offset estimator 208 can be applied to any periodic preamble signals. In the following description, the preamble as defined in IEEE 802.16e is used as an example, where the preamble of any BS occupies every third subcarrier in the frequency domain. Then the preamble is periodic in three slots, slot 1, slot 2 and slot 3 in the time domain, as shown in FIG. 5. Also, the OFDM-based system 100 is assumed to be a 1024-subcarrier system, as an example.

Figure 6:
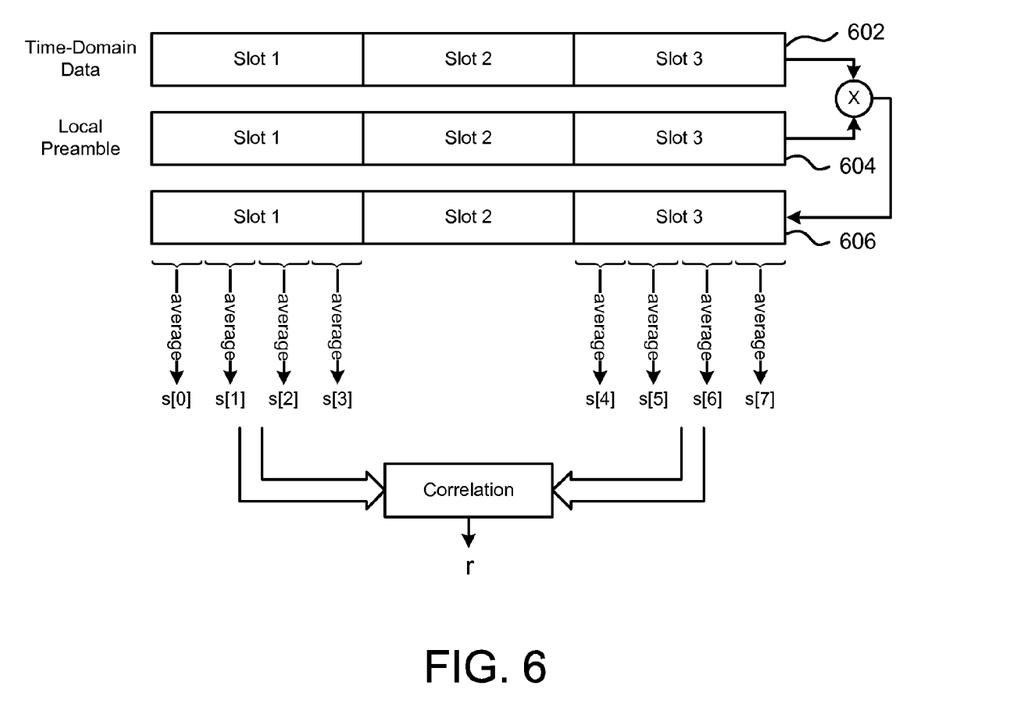
FIG. 6 is a diagram illustrating an operation of the fine frequency estimator in accordance with an embodiment of the invention.

The oversampling unit 420 of the fine frequency offset estimator 208 oversamples the received time-domain preamble by a factor of three, i.e, three times, to produce an oversampled signal preamble 602 with slot 1, slot 2 and slot 3, as shown in FIG. 6. The values of the oversampled signal preamble 602 are denoted herein as x[n]. Assuming that the time index 0 is the starting point of the oversampled signal preamble 602, then x[0]~x[1023] constitute slot 1 of the oversampled signal preamble 602, x[1024]~x[2047] constitute slot 2 of the oversampled signal preamble 602, and x[2048]~x[3071] constitute slot 3 of the oversampled signal preamble 602. The oversampling unit 420 also oversamples the time-domain reference preamble of the serving BS in the same manner to produce an oversampled reference preamble 604 with slot 1, slot 2 and slot 3, as shown in FIG. 6. The values of the oversampled reference preamble 604 are denoted herein as p[n]. Again, assuming that the time index 0 is the starting point of the oversampled reference preamble 604, then p[0]~p[1023] constitute slot 1 of the oversampled reference preamble 604, p[1024]~p[2047] constitute slot 2 of the oversampled reference preamble 604, and p[2048]~p[3071] constitute slot 3 of the oversampled reference preamble 604. The oversampled signal preamble 602 and the oversampled reference preamble 604 are then transmitted to the multiplying unit 422. In an alternative embodiment, the oversampled reference preamble 604 may be generated elsewhere and provided to the multiplying unit 422.

The multiplying unit 422 multiplies the values of the oversampled signal preamble 602 with conjugates of the corresponding values of the oversampled reference preamble 604 to produce an output set 606 of multiplied values. In particular, the multiplying unit 422 performs point-by-point multiplication between x[n] and p*[n], where p*[n] are the conjugates of p[n]. Since the output set 606 includes the same number of values as the preambles 602 and 604, the output set 606 can be viewed as having slot 1 of multiplied values, slot 2 of multiplied values and slot 3 of multiplied values, as illustrated in FIG. 6.

The averaging unit 424 averages the multiplied values of the output set 606 over segments of L values to derive averaged values s[n]. For example, the averaging of multiplied values in slot 1 of the output set 606 is given by $$s[0] = \sum_{n=0}^{L-1} x[n]p^*[n]$$

$$s[1] = \sum_{n=L}^{2L-1} x[n]p^*[n]$$

$$\vdots$$

$$s\left[\frac{1024}{L} - 1\right] = \sum_{n=1024-L}^{1023} x[n]p^*[n].$$

In the above computation, it is assumed that 1024/L is an integer. Similarly, the averaging unit 424 performs the averaging of multiplied values in slot 3 of the output set 606, as follows:

$$s\left[\frac{1024}{L}\right] = \sum_{n=2048}^{2048+L-1} x[n]p^*[n]$$

$$s\left[\frac{1024}{L} + 1\right] = \sum_{n=2048+L}^{2048+2L-1} x[n]p^*[n]$$

$$\vdots$$

$$s\left[\frac{2048}{L} - 1\right] = \sum_{n=3072-L}^{3071} x[n]p^*[n].$$

This averaging effectively removes interference.

The correlation unit 426 performs self-correlation using the sequence s[n] for slot 1 and the sequence s[n] for slot 3 to derive a self-correlation value r using the following equation:

$$r = \sum_{n=0}^{1024/L-1} s^*[n]s\left[n + \frac{1024}{L}\right].$$

The computing unit 428 then computes an estimated fine frequency offset using the self-correlation value r. If the phase of r is denoted as $\phi$, then the computing unit 428 can estimate the fine frequency offset $f_{fine}$ using the following equation:

$$f_{fine} = \frac{\varphi}{2\pi}\frac{3}{2}\Delta f,$$

where $\Delta f$ is the subcarrier spacing.

In the above fine frequency offset estimation, the parameter L should be properly chosen. If the parameter L is too small, then there is not enough averaging to get rid of interference. If the parameter L is too large, then large frequency offset may result in values of s[n] close to zero. For a 1024-subcarrier system, a typical value for L is 64.

The fine frequency offset estimator 208 estimates only the fine frequency offset because the phase difference value ranges from $-\pi$ to $+\pi$. A phase difference value beyond this range is wrapped around, which creates ambiguity in estimating a large frequency offset. For example, the frequency offsets $f_o$ and $f_o+3/T_S$, where $T_S$ is the preamble period, are not distinguishable by the fine frequency offset estimation. In order to resolve this ambiguity, the coarse frequency offset estimator 210 estimates coarse frequency offset.

Figure 7:
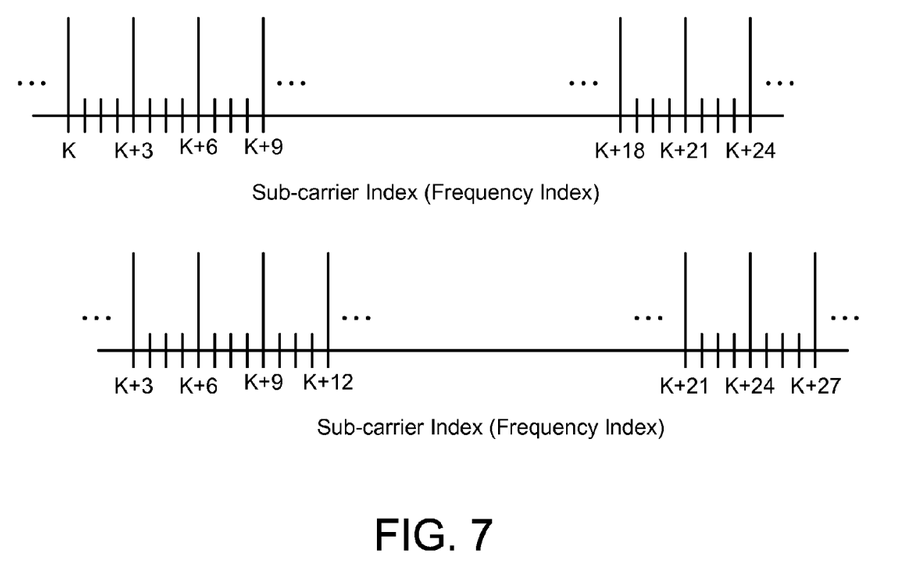
FIG. 7 is a diagram of a signal shifted by an integer multiple of sub-carrier spacing from the original position.

After the fine frequency offset is estimated and corrected, there is little or no inter-carrier interference in the frequency domain. In other words, the signal is now aligned in the frequency grid (sub-carrier). However, because of a large frequency offset, the signal can be shifted by an integer multiple of sub-carrier spacing from the original position. This is illustrated in FIG. 7, where the lower signal is shifted by three sub-carriers. This sub-carrier shift is determined as an estimated coarse frequency offset by the coarse frequency offset estimator 210.

A coarse frequency offset estimation performed by the coarse frequency offset estimator 210 in accordance with an embodiment of the invention is now described. First, the frequency offset range, i.e., the sub-carrier offset range, is determined. The frequency offset range is a known parameter provided by the manufacturer of the local oscillator 106. For each sub-carrier offset within the frequency offset range, the following steps are executed. A reference frequency-domain preamble is shifted by this offset and cross-correlated with the frequency-domain preamble of the adjusted received signal, which has been corrected for fine frequency offset. Next, the value in sub-carrier i+3 is multiplied with the conjugate value in sub-carrier i, where i represents the position in which the shifted preamble is not equal to zero. This step is known as self-correlation. Next, all the values produced by self-correlation are added together to derive a total self-correlation value for this particular offset. After the received signal has been processed for each offset within the frequency offset range, the largest self-correlation value from all the self-correction values is selected. The frequency offset that corresponds to this largest self-correction value is determined to be the estimated coarse frequency offset.

The frequency offset estimator 204 produces the final estimated frequency offset using the estimated fine frequency offset and the estimated coarse frequency offset, which were derived using a single frame of the received signal. In some embodiments, the estimated frequency offset can be averaged over many different frames of the received signal by the frequency offset estimator 108 to produce a more accurate estimated frequency offset.

Figure 8:
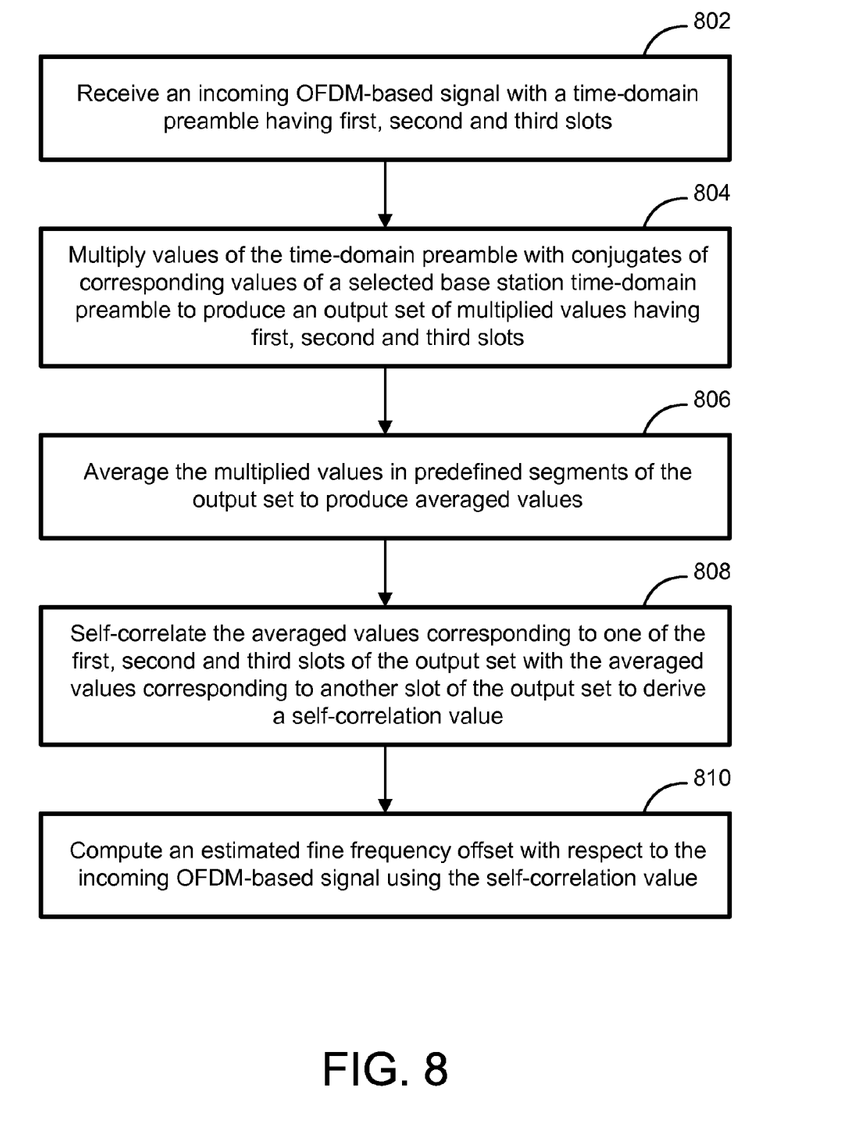
FIG. 8 is a flow diagram of a method for performing synchronization in an OFDM-based device in accordance with an embodiment of the invention.

A method for performing synchronization in an OFDM-based device in accordance with an embodiment of the invention is described with reference to a flow diagram of FIG. 8. At block 802, an incoming OFDM-based signal with a time-domain preamble having first, second and third slots is received. At block 804, values of the time-domain preamble are multiplied with conjugates of corresponding values of a selected base station time-domain preamble to produce an output set of multiplied values having first, second and third slots. At block 806, the multiplied values in predefined segments of the output set are averaged to produce averaged values. At block 808, the averaged values corresponding to one of the first, second and third slots of the output set are self-correlated with the averaged values corresponding to another slot of the output set to derive a self-correlation value. At block 810, an estimated fine frequency offset with respect to the incoming OFDM-based signal is computed using the self-correlation value.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing synchronization in an OFDM-based device, the method comprising:
receiving an incoming OFDM-based signal with a time-domain preamble having first, second and third slots;
multiplying values of the time-domain preamble with conjugates of corresponding values of a selected base station time-domain preamble to produce an output set of multiplied values having first, second and third slots;
averaging the multiplied values in predefined segments of the output set to produce averaged values;
self-correlating the averaged values corresponding to one of the first, second and third slots of the output set with the averaged values corresponding to another slot of the output set to derive a self-correlation value; and
computing an estimated fine frequency offset with respect to the incoming OFDM-based signal using the self-correlation value.

2. The method of claim 1 further comprising oversampling the time-domain preamble of the OFDM-based signal to produce the values of the time-domain preamble.

3. The method of claim 2 wherein the oversampling includes oversampling the time-domain preamble of the OFDM-based signal by a factor of times.

4. The method of claim 1 wherein the self-correlating includes self-correlating the averaged values corresponding to the first slot of the output set with the averaged values corresponding to the third slot of the output set to derive the self-correlation value.

5. The method of claim 1 wherein the OFDM-based device is a 1024-subcarrier system and wherein the predefined segments are segments of 64 values.

6. The method of claim 1 wherein the computing includes computing the estimated fine frequency offset with respect to the incoming OFDM-based signal using:

$$f_{fine} = \frac{\varphi}{2\pi} \frac{3}{2} \Delta f,$$

where $f_{fine}$ is the estimated fine frequency offset, $\phi$ is the phase of the self-correlation value and $\Delta f$ is the subcarrier spacing.

7. The method of claim 1 further comprising:
cross-correlating a particular frequency-domain preamble of the incoming OFDM-based signal with the selected base station frequency-domain preamble at different offset shifts to produce cross-correlated values;
self-correlating the cross-correlation values to derive self-correlation values; and
selecting an offset shift that correspond to the largest value of the self-correlation values to derive an estimated coarse frequency offset.

8. The method of claim 1 further comprising:
cross-correlating values of the incoming OFDM-based signal with conjugates of values of a base station time-domain preamble for each base station from a plurality of base stations over a predefined time period to produce cross-correlation values for each of the base stations;
finding a peak value of the cross-correlation values for each of the base stations;
finding the maximum value of peak values of the base stations; and
selecting a particular base station of the base stations that corresponds to the maximum value as a serving base station.

9. The method of claim 8 further comprising determining whether the maximum value exceeds a threshold to decide whether to use the maximum value to select the particular base station as the serving base station.

10. The method of claim 1 further comprising:
multiplying values of the incoming OFDM-based signal with conjugates of corresponding values of a delayed version of the incoming OFDM-based signal to produce a signal sequence of multiplied values;
multiplying values of a base station time-domain preamble for each base station from a plurality of base stations with conjugates of corresponding values of a delayed version of the base station time-domain preamble to produce a reference sequence of multiplied values;
cross-correlating the multiplied values of the signal sequence with conjugates of the multiplied values of the reference sequence for each of the base stations over a predefined time period to produce cross-correlation values for each of the base stations;
finding a peak value of the cross-correlation values for each of the base stations;
finding the maximum value of peak values of the base stations; and
selecting one of the base stations that corresponds to the maximum value as a serving base station.

11. An OFDM-based device comprising:
a fine frequency offset estimator configured to estimate fine frequency offset using an incoming OFDM-based signal with a time-domain preamble having first, second and third slots, the fine frequency offset estimator comprising:
a multiplying unit configured to multiply values of the time-domain preamble with conjugates of corresponding values of a selected base station time-domain preamble to produce an output set of multiplied values having first, second and third slots;
an averaging unit configured to average the multiplied values in predefined segments of the output set to produce averaged values;
a correlation unit configured to self-correlate the averaged values corresponding to one of the first, second and third slots of the output set with the averaged values corresponding to another slot of the output set to derive a self-correlation value; and
a computing unit configured to compute an estimated fine frequency offset with respect to the incoming OFDM-based signal using the self-correlation value.

12. The OFDM-based device of claim 11 wherein the fine frequency offset estimator further comprises an oversampling unit configured to oversample the time-domain preamble of the OFDM-based signal to produce the values of the time-domain preamble.

13. The OFDM-based device of claim 12 wherein the oversampling unit is configured to oversample the time-domain preamble of the OFDM-based signal by a factor of three.

14. The OFDM-based device of claim 11 wherein the correlating unit is configured to self-correlate the averaged values corresponding to the first slot of the output set with the averaged values corresponding to the third slot of the output set to derive the self-correlation value.

15. The OFDM-based device of claim 11 wherein the OFDM-based device is a 1024-subcarrier system and wherein the predefined segments are segments of 64 values.

16. The OFDM-based device of claim 11 wherein the computing unit is configured to compute the estimated fine frequency offset with respect to the incoming OFDM-based signal using:

$$f_{fine} = \frac{\varphi}{2\pi}\frac{3}{2}\Delta f,$$

where $f_{fine}$ is the estimated fine frequency offset, φ is the phase of the self-correlation value and Δf is the subcarrier spacing.

17. The OFDM-based device of claim 11 further comprising a coarse frequency offset estimator configured to cross-correlate a particular frequency-domain preamble of the incoming OFDMA signal with the selected base station frequency-domain preamble at different offset shifts to produce cross-correlation signals, the coarse frequency offset estimator being further configured to self-correlate the cross-correlation signals to derive self-correlation values and to select an offset shift that correspond to the largest value of the self-correlation values to derive an estimated coarse frequency offset.

18. The OFDM-based device of claim 11 further comprising a base station selector configured to cross-correlate values of the incoming OFDM-based signal with conjugates of values of a base station time-domain preamble for each base station from a plurality of base stations over a predefined time period to produce cross-correlation values for each of the base stations, the base station selector being further configured to find a peak value of the cross-correlation values for each of the base stations and to find the maximum value of peak values of the base stations, the base station selector being configured to select one of the base stations that corresponds to the maximum value as a serving base station.

19. The OFDM-based device of claim 18 wherein the base station selector is further configured to determine whether the maximum value exceeds a threshold to decide whether to use the maximum value to select the particular base station as the serving base station.

20. The OFDM-based device of claim 11 further comprising a base station selector configured to multiply values of the incoming OFDM-based signal with conjugates of corresponding values of a delayed version of the incoming OFDM-based signal to produce a signal sequence of multiplied values and to multiply values of a base station time-domain preamble for each base station from a plurality of base stations with conjugates of corresponding values of a delayed version of the base station time-domain preamble to produce a reference sequence of multiplied values, the base station selector being further configured to cross-correlate the multiplied values of the signal sequence with conjugates of the multiplied values of the reference sequence for each of the base stations over a predefined time period to produce cross-correlation values for each of the base stations, the base station selector being further configured to find a peak value of the cross-correlation values for each of the base stations and to find the maximum value of peak values of the base stations, the base station selector being configured to select one of the base stations that corresponds to the maximum value as a serving base station.

\* \* \* \* \*